United States Patent
Cabrera Lafuente et al.

(10) Patent No.: US 11,240,082 B1
(45) Date of Patent: Feb. 1, 2022

(54) METHODS AND SYSTEMS FOR MODULATING AND DE MODULATING DATA

(71) Applicant: Arctan, Inc., Arlington, VA (US)

(72) Inventors: Renan Andres Cabrera Lafuente, Arlington, VA (US); Oscar Roberto Cabrera Lafuente, Arlington, VA (US)

(73) Assignee: ARCTAN, INC., Arlington, VA (US)

( * ) Notice: Subject to any disclaimer, the term of this patent is extended or adjusted under 35 U.S.C. 154(b) by 0 days.

(21) Appl. No.: 16/845,613

(22) Filed: Apr. 10, 2020

Related U.S. Application Data (60) Provisional application No. 62/831,939, filed on Apr. 10, 2019.

(51) Int. Cl.
   *H04L 27/26* (2006.01)

(52) U.S. Cl.
   CPC ........ *H04L 27/2628* (2013.01); *H04L 27/265* (2013.01); *H04L 27/2605* (2013.01)

(58) Field of Classification Search
   CPC .................................................. H04L 27/2628
   USPC ......................................................... 375/260
   See application file for complete search history.

(56) References Cited

U.S. PATENT DOCUMENTS

| | | | | |
|---|---|---|---|---|
| 9,057,785 B1* | 6/2015 | Lee | ........................... | G01S 7/41 |
| 2002/0172213 A1* | 11/2002 | Laroia | ................. | H04L 27/2614 |
| | | | | 370/430 |
| 2007/0230600 A1* | 10/2007 | Bertrand | ........... | H04W 74/0833 |
| | | | | 375/260 |
| 2009/0323510 A1* | 12/2009 | Furrer | ................... | H04L 27/265 |
| | | | | 370/210 |
| 2011/0129028 A1* | 6/2011 | Lee | ................... | H04L 25/03171 |
| | | | | 375/262 |
| 2013/0170586 A1* | 7/2013 | Yucek | ..................... | G01S 7/021 |
| | | | | 375/316 |
| 2014/0293811 A1* | 10/2014 | Rao | ...................... | H04B 17/309 |
| | | | | 370/252 |
| 2015/0281433 A1* | 10/2015 | Gainsboro | ........ | H04M 3/42221 |
| | | | | 379/88.01 |
| 2016/0269980 A1* | 9/2016 | Simon | ................. | H04L 27/2692 |

FOREIGN PATENT DOCUMENTS

| | | |
|---|---|---|
| CN | 1859346 | 11/2006 |
| CN | 101827060 | 9/2010 |

OTHER PUBLICATIONS

English language abstract of CN 1859346 published Nov. 8, 2006.
English language abstract of CN 101827060 published Sep. 8, 2010.
(Continued)

*Primary Examiner* — Lihong Yu
(74) *Attorney, Agent, or Firm* — DLA Piper LLP (US)

(57) ABSTRACT

Methods and systems for modulating and demodulating data in systems. Bits can be converted into complex-valued symbols. An Inverse Fast Fourier Transform (FFT) can be applied to the complex-valued symbols that represent the bit groups. An FFT time window can be replaced with a time window and a frequency window. A signal comprising the time window and the frequency window can be transmitted. The signal can be converted into a complex-valued symbol. The complex-valued symbols can be converted into bits.

17 Claims, 10 Drawing Sheets

Example basic OFDM system (56) References Cited

OTHER PUBLICATIONS

David H. Bailey et al., "A Fast Method for the Numerial Evaluation of Continuous Fourier and Laplace Transforms", SIAM J. on Scientific Computing, vol. 15, No. 5, pp. 1-8, (Sep. 1994).
Chourdakis, "Option pricing using the fractional FFT", The Journal of Computational Finance, vol. 8, No. 2, pp. 1-18, Winter 2004.
B. Dulek et al., "A novel approach to dictionary construction for automatic modulation classification", Journal of the Franklin Institute, vol. 351, pp. 2991-3012, (Feb. 15, 2014).

* cited by examiner

FIG. 1 Example basic OFDM system

FIG. 2 Example OFDM symbol comparison between the conventional FFT and the FAFT

FIG. 3 Example FAFT computation of two similar signals. See FIG. 4 to compare with FFT.

FIG. 4 Example FFT computation of the same two same signals in FIG. 3

FIG 5: *FAFT spectrum that can resolve the variation of frequencies of two signals in time. This may not be able to be achieved by using the standard FFT algorithm as shown in FIG 6.*

FIG 6: *Example of FFT spectrum of two signals that are not resolved in frequency. The same signals can be resolved using FFT as shown in FIG 5.*

FIG. 7A

```
import numpy as np
import scipy.interpolate

# Defining basic parameters:
K = 64              # Number of OFDM subcarriers
P = 8               # Number of pilot carriers per OFDM block
CP = int(K/4)       # Cyclic Prefix length
pilotValue = 3+3j   # Complex value for the pilots that are

# All subcarriers indices ([0, 1, ... K-1]):
allCarriers = np.arange(K)

# Pilots every K/P carriers:
pilotCarriers = allCarriers[::int(K/P)]

# Append a pilot carrier to the end:
pilotCarriers = np.hstack([pilotCarriers,
            np.array([allCarriers[-1]])])
P = P + 1

# Data carrier indices:
dataCarriers = np.delete(allCarriers, pilotCarriers)

# Considering a 16QAM, the next structure defines a mapping table
# between 0/1's bits and complex values:
qam16_maptable = {
    (0,0,0,0) : -3-3j,
    (0,0,0,1) : -3-1j,
    (0,0,1,0) : -3+3j,
    (0,0,1,1) : -3+1j,
    (0,1,0,0) : -1-3j,
    (0,1,0,1) : -1-1j,
    (0,1,1,0) : -1+3j,
    (0,1,1,1) : -1+1j,
    (1,0,0,0) :  3-3j,
    (1,0,0,1) :  3-1j,
    (1,0,1,0) :  3+3j,
    (1,0,1,1) :  3+1j,
    (1,1,0,0) :  1-3j,
```

The table above is the so call constellation scheme.

# From the table above, it shows that there are four bits per carrier:
bits_per_carrier = 4

# Then, the size in bits of the OFDM payload is:
payload_per_OFDM = len(dataCarriers)*bits_per_carrier

# Generating a bit stream:
bit_stream = np.random.binomial(n=1, p=0.5, size=(payload_per_OFDM, ))

that looks like [0 0 1 1 1 0 0 0 0 0 1 1 1 1 1 0 0 0 0 0 ... ]

# Sets a 4-bits groups arrangement (to generate parallel groups)
# from the bit stream (serial):
bit_group = bit_stream.reshape((len(dataCarriers), bits_per_carrier))

# that looks like:
# [[0 0 1 1]
#  [1 0 0 0]
#  [0 0 1 1]
#  [1 1 1 0]
#  [0 0 0 0]
#  ...     ]

# Mapping the bit groups into complex values:
qam16 = np.array([qam16_maptable[tuple(b)] for b in bit_group])

that looks like [-3.+1.j  3.-3.j -3.+1.j  1.+3.j -3.-3.j ...]

# Creating the OFDM symbol:
OFDM_data = np.zeros(K, dtype=complex)  # K subcarriers
OFDM_data[pilotCarriers] = pilotValue   # setting the pilot subcarriers
OFDM_data[dataCarriers]  = qam16        # setting the data subcarriers
```

FIG. 7C

```
# Note that OFDM_data is in the frequency domain

# At this stage, the OFDM_data can be transformed to the time-domain
# by the Inverse FFT:
OFDM_time_domain = np.fft.ifft(OFDM_data)

that looks like: [0.625+0.9375j 0.2113853-0.42481569j ... ]

This embodiment replaces the Inverse FFT by the Inverse FAFT.

# Appending the CP to the OFDM symbol
cp_data = OFDM_time_domain[-CP:]   # takes the last CP samples copying it to the beginning:
TX_OFDM = np.hstack([cp_data, OFDM_time_domain])

# And the above array represents the signal that is going to be transmitted
# through an antenna as electromagnetic waves.

# Next, to simulate a very simple impulse response for a wireless channel:
channel_response = np.array([1, 0, 0.3+0.3j])

# Defining a signal-to-noise ratio in dB, that occurs on the receiver side:
signal_noise_ratio = 25

# The signal on the receiver antenna is the convolution of the
# transmitted signal with the channel response.
conv = np.convolve(TX_OFDM, channel_response)
signal_power = np.mean(abs(conv**2))

# Calculating the noise power based on the signal power and
# the signal-to-noise ratio:
sigma2 = signal_power * 10**(-signal_noise_ratio/10)

# Generating a complex noise with the variance sigma2
noise = np.sqrt(sigma2/2)*(np.random.randn(*conv.shape) +
1j*np.random.randn(*conv.shape))

# Then, the simulated signal at the receiver side is:
RX_OFDM = conv + noise
```

FIG. 7D

```
# The receiver removes the CP carriers:
RX_OFDM_without_CP = RX_OFDM[CP:(CP+K)]

# Next, the signal is transformed back to the frequency domain through the FFT:
OFDM_freq_domain = np.fft.fft(RX_OFDM_without_CP)

This embodiment replaces the FFT by the FAFT.

# To estimate and equalize the wireless channel in this basic example,
# it is applied a simple zero-forcing channel estimation followed
# by a simple interpolation.

# The pilot values and their position in the frequency domain
# are known to the transmitter as well as to the receiver side:
pilots = OFDM_freq_domain[pilotCarriers]

# From the received pilot subcarriers, the receiver can estimate
# the effect of the wireless channel onto that subcarrier:
channel_estimation_pilots = pilots/pilotValue

# However, to recover the original data for the remaining subcarriers,
# it is necessary to interpolate the channel values between the pilot carriers
# in order to get an estimation of the channel in the data carriers:
channel_estimation_abs = scipy.interpolate.interp1d(pilotCarriers,
                            abs(channel_estimation_pilots),
                            kind='linear')(allCarriers)
channel_estimation_phase = scipy.interpolate.interp1d(pilotCarriers,
                              np.angle(channel_estimation_pilots),
                              kind='linear')(allCarriers)

# And the estimated channel is:
channel_estimation = channel_estimation_abs*np.exp(1j*channel_estimation_phase)

# To equalize the received signal it is required to remove
# the channel influence over each subcarrier:
OFDM_equalized = OFDM_freq_domain/channel_estimation

# Before de-mapping the subcarriers with 16QAM, the pilot carriers must be removed:
qam16_estimated = OFDM_equalized[dataCarriers]
```

FIG. 7E

```
# The received data points in 'qam16_estimated' are compared
# with the original 16QAM constellation scheme points
# and those closest to the original points are chosen:
qam16_demaptable = {v : k for k, v in qam16_maptable.items()}

# Generating the constellation points:
constellation = np.array([x for x in qam16_demaptable.keys()])

# Calculating the distance between the received points and the constellation points:
distances = abs(qam16_estimated.reshape((-1,1)) - constellation.reshape((1,-1)))

# Getting the points' indices with the minimal distance to the constellation points:
points_index = distances.argmin(axis=1)

# Recovering the actual constellation points:
recovered_points = constellation[points_index]

# De-mapping the recovered points to the bit groups:
bit_group_estimated = np.vstack([qam16_demaptable[p] for p in recovered_points])

# Finally, join the parallel bit groups into a bit stream, in order to get original serial bit data:
bit_stream_estimated = bit_group_estimated.reshape((-1,))

# The output looks like:
# [0 0 1 1 1 0 0 0 0 0 1 1 1 1 1 0 0 0 0 0 ... ]
```

METHODS AND SYSTEMS FOR MODULATING AND DE MODULATING DATA

CROSS-REFERENCE TO RELATED APPLICATIONS

This application claims priority to U.S. Provisional Application No. 62/831,939, filed Apr. 10, 2019, which is incorporated by reference in its entirety.

BRIEF DESCRIPTION OF THE DRAWINGS

FIG. 7A-7E illustrates example pseudo-code for an example OFDM transmission system, according to aspects of the disclosure.

DETAILED DESCRIPTION OF EMBODIMENTS OF THE INVENTION

Modern communication systems can rely on an Orthogonal Frequency Division Multiplexing (OFDM) scheme and other similar methods to encode digital data on multiple carrier frequencies. Every OFDM symbol of length T can have K sub-carriers that are 1/T apart from each other to ensure orthogonality even if the sub-carriers partially overlap. A specific sub-carrier can be associated with a complex-value number belonging to a Quadrature Amplitude Modulation (QAM) constellation that can encode groups of digital bits according to a predefined convention (frequency domain). Then, at the transmitter side, the sequence of complex values can be modulated using the Inverse FFT in order to get a signal in the time domain that can be transmitted as an electromagnetic wave. At the receiver side, the Fast Fourier Transform (FFT) can be used to recover the data in the frequency domain which can then be interpreted according to the QAM constellation to obtain the original sequence of bits.

As the transmission capacity requirements increase, the FFT size can become a problem. The higher the data rate of transmission, the larger the required FFT size can be. However, larger FFT sizes can carry proportionally less useful information due to the conventional padding with zeros. This strategy, called zero padding (ZP), may be necessary to increase the sampling rate in the time domain of the actual signal that will be transmitted by the antenna.

Although this zero padding may help with issues related to the interference (including the Inter-Symbol Interference) and signal synchronization, the cost may be a significant reduction of the ratio of useful transmitted data to less than a half. Moreover, this cost may be compounded by the higher demand of computational resources in terms of memory and processing time.

Therefore, conventional zero padding of ever larger parts of OFDM carriers can lead to a severe reduction of the proportion of useful transmitted data, which can translate into a loss of efficiency and a higher computational costs.

In order to reduce the ratio between zero padding (ZP) and the actual data that conform an OFDM symbol, a FFT variant called Fast Accurate Fourier Transform (FAFT) can be used. The Fast Accurate Fourier Transform (FAFT) is a Fast Fourier Transform (FFT) modification that can be applied in many engineering fields such as telecommunications. For example, the FAFT can be used where the digital modulation/demodulation systems are based on the orthogonal frequency division multiplexing (OFDM) method.

In contrast to the standard FFT, the FAFT can have a tunable frequency window that can reduce the need for zero padding. The FAFT can also be more versatile because it can have independent variable windows in both time and frequency. This advantage can reduce the ability to introduce zero padding with a consequent increase of efficiency for higher data transmission rates.

Conventional OFDM systems based on FFT can require ZP to increase the sampling rate in a time domain signal. In this embodiment, the data modulation on the transmitter side can be carried out by the inverse FAFT, which can be capable to reduce ZP to only a few carriers in the frequency domain while getting the same sampling rate in the time domain. As in the conventional OFDM system, the output of the inverse FAFT can be processed copying a small section of the tail of the modulated data to the beginning according to a Cyclic Prefix (CP) scheme, which can be a guard interval devised to protect the signal from Inter-Symbol Interference. As a final step in the source side, the signal can be turn into an electromagnetic wave that can be transmitted to the receptor.

On the receiver side, the CP can be removed as in the conventional OFDM system but the remaining part can be demodulated using the FAFT with the same window employed by the transmitter when applying the inverse FAFT. The demodulated data can also be absent from large ZP carriers that can otherwise be required by standard OFDM systems using the FFT. From this point, in some embodiments, the same standard methods can be employed to estimate the channel, equalize the signal, and de-map the sequence of complex numbers using the QAM constellation retrieving the original data bits.

The FAFT can be suitable for the numerical evaluation of signals where a significant fraction of the carriers is zero. So, for example, a conventional FFT applied to a 4096-QAM OFDM system can require more ZP to get a signal resolution, as compared to the FAFT method.

Moreover, some aspects of the disclosure can be used to increase the data rate transmission for low and extremely low frequency communications exploiting the higher resolution provided by FAFT, which may allow for extra-fine signal modulation. For example, the FAFT spectrum in FIG. 3 features higher resolution lobes in low frequencies compared with the corresponding FFT spectrum in FIG. 4. Such lobes can be modulated in order to encode information. This possibility may not be possible using FFT because it may fail to resolve those low frequency lobes.

Figure 5:
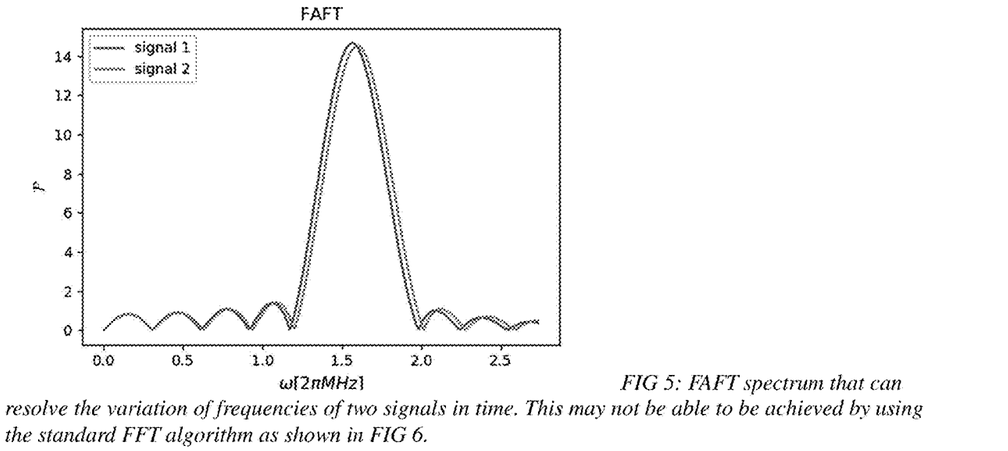
FIG. 5 illustrates the FAFT spectrum that can resolve the variation of frequencies of two signals in time, according to aspects of the disclosure.
Figure 6:
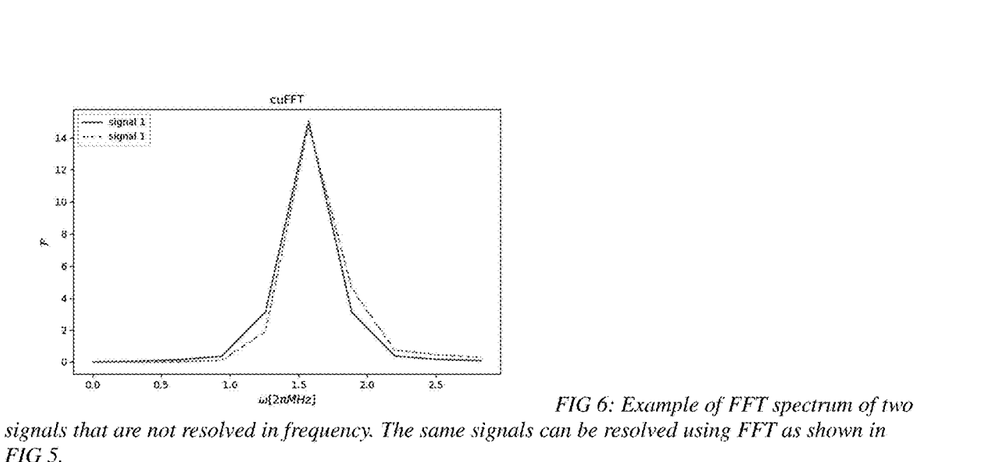
FIG. 6 illustrates an example of FFT spectrum of two signals that are not resolved in frequency, according to aspects of the disclosure.
Figure 7A:
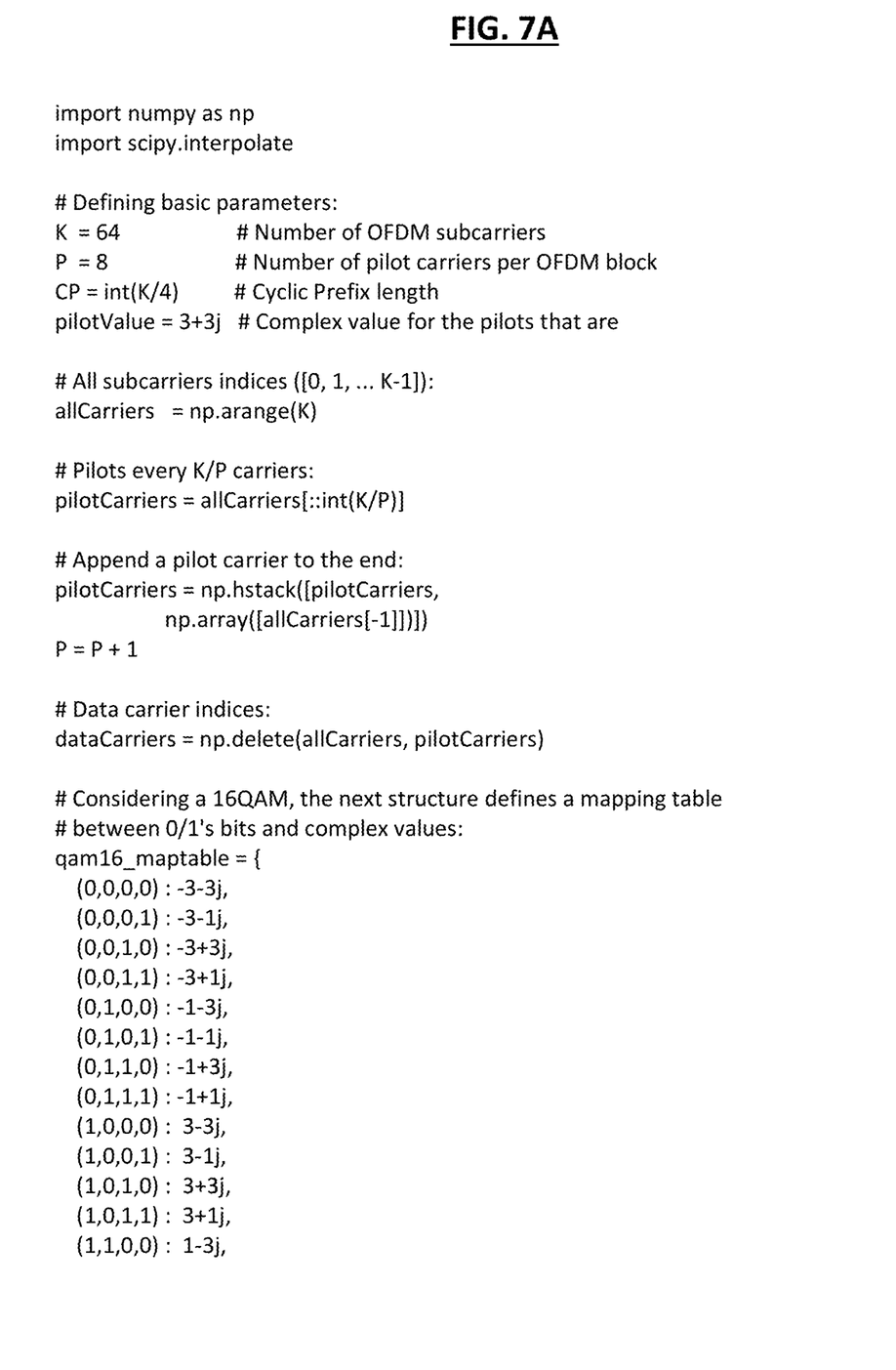
Figure 7B:
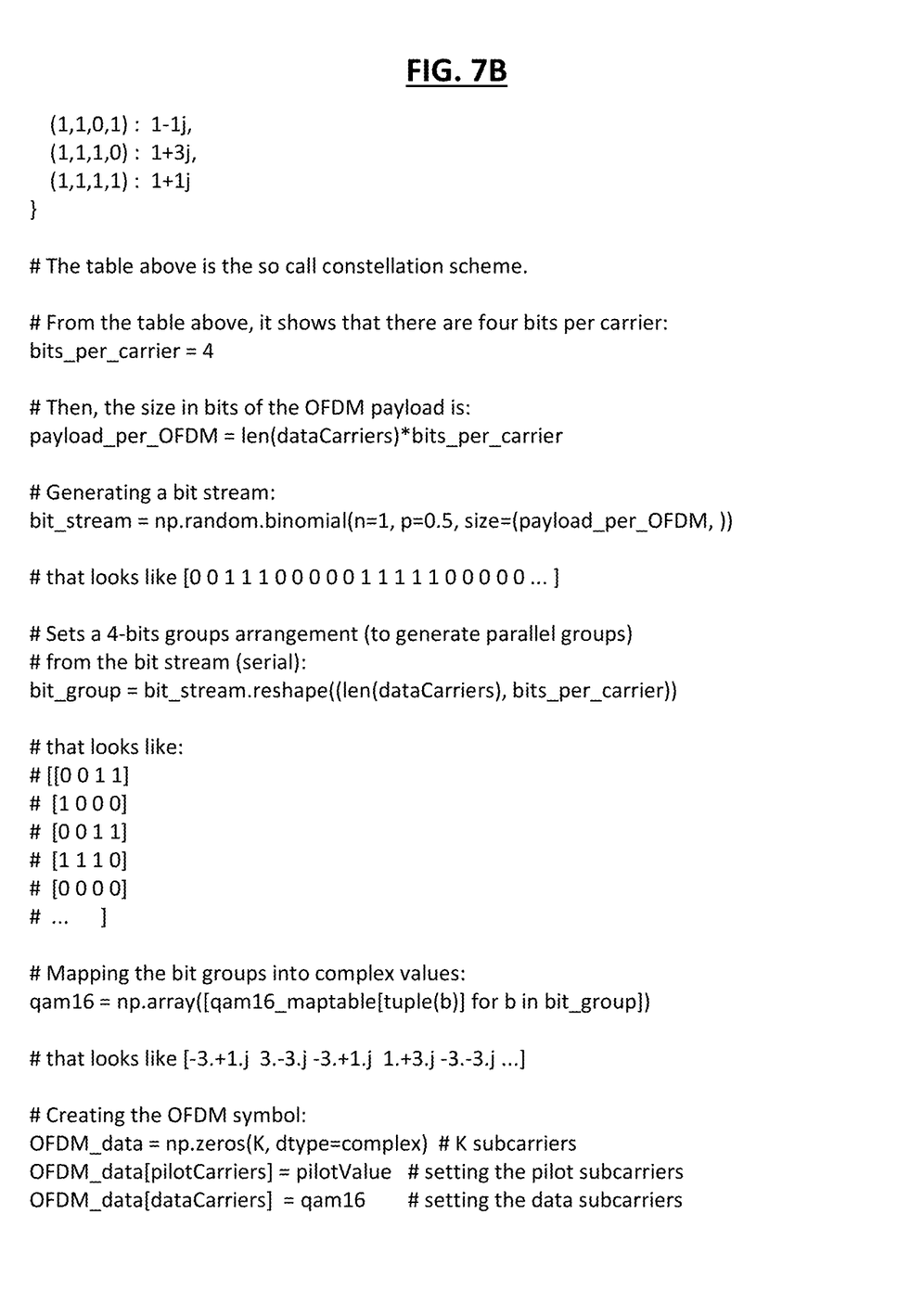
Figure 7C:
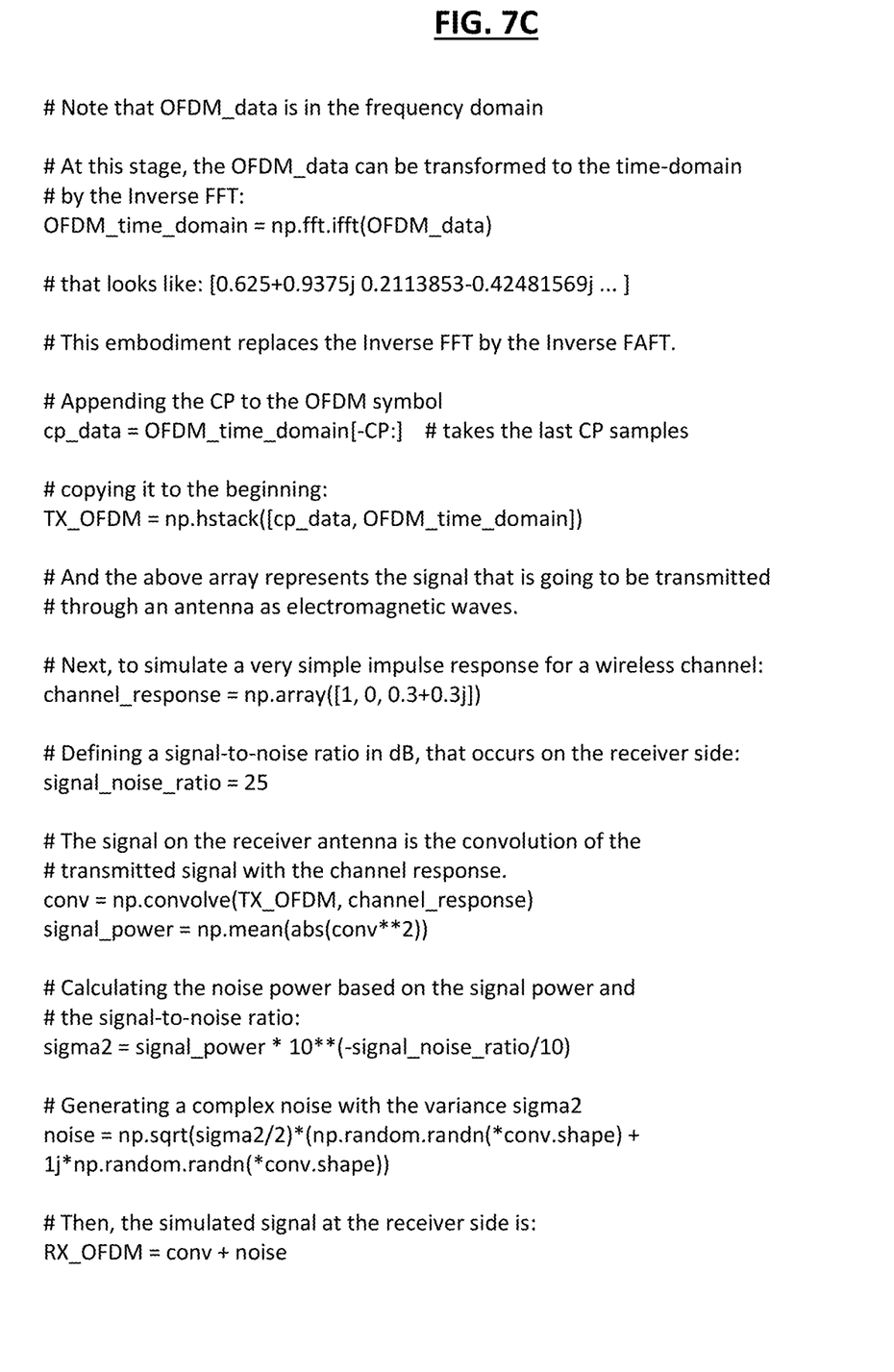
Figure 7E:
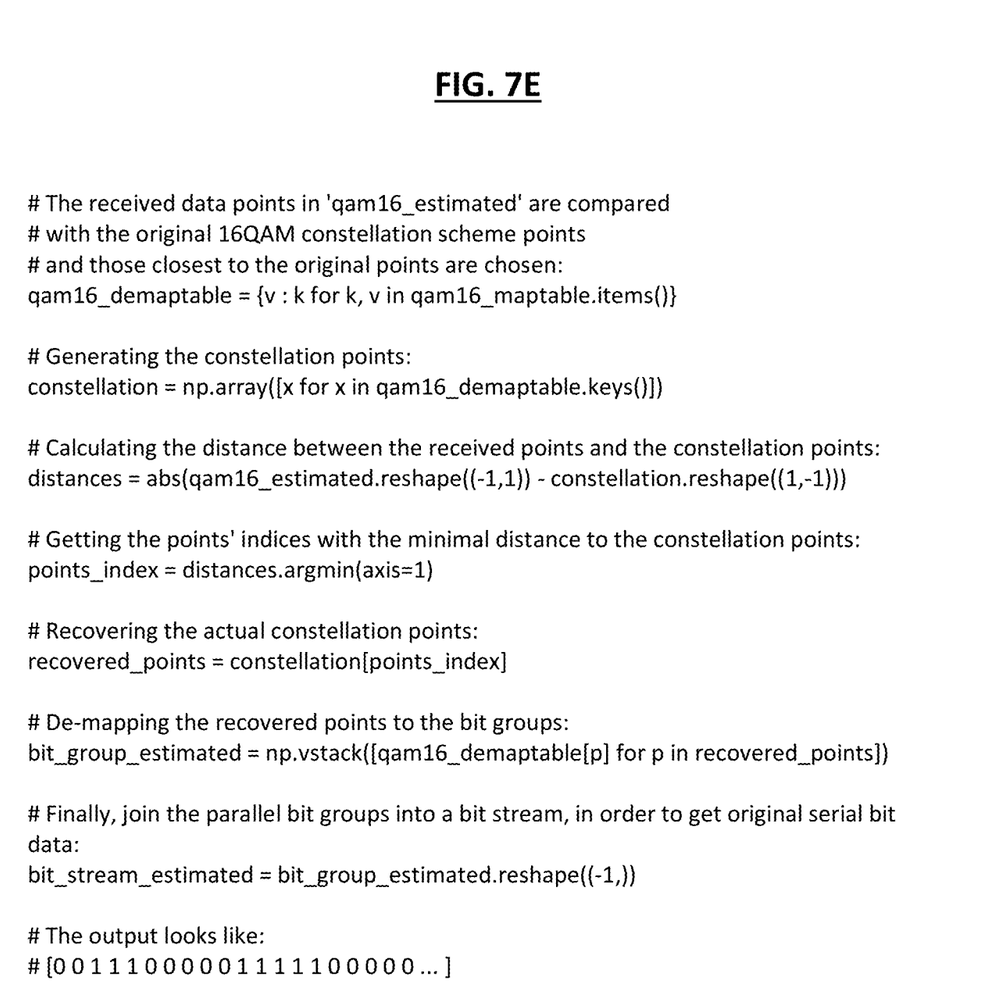

In addition to applications in telecommunications, FAFT can be used to perform signal analysis with higher spectral resolution. One example case is the achievement of higher precision measurements using Doppler-effect radars where the resolution of frequencies is important. The higher resolution, which can be provided by FAFT, can be directly used to detect finer displacements of frequency, thus helping enhance current Doppler radars. An example of the frequency resolution of two signals produced by FAFT is shown in FIG. 5, which can e favorably compared with FFT in FIG. 6 showing no resolution between the signals.

A second example application relying on the higher resolutions provided by FAFT can be the construction of digital-signal watermarking that could be used in images, video or music. This type of application can introduce finer spectral features that may be otherwise overlooked by standard FFT algorithms. As it happens with the Doppler effect, FAFT can be used to distinguish two different signals that are otherwise not differentiated by FFT.

Moreover, the FAFT can offer better resolution to improve low frequency data transmissions. The FAFT variable window size can also increase the detail at which low frequency data transmissions are modulated, allowing better data rates.

Figure 1:
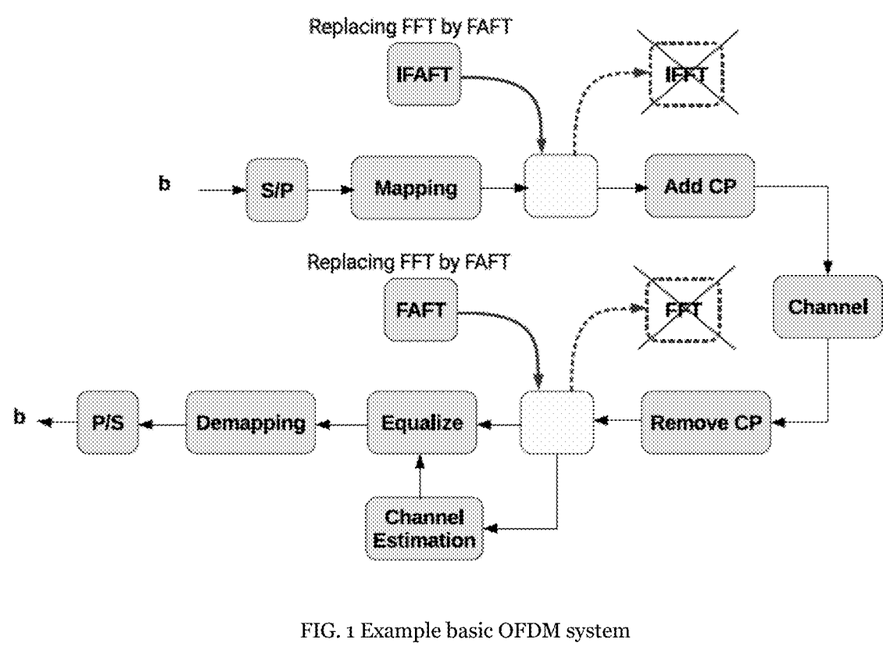
FIG. 1 illustrates parts of an OFDM communication system, according to aspects of the disclosure.

FIG. 1 illustrates parts of an OFDM communication system, according to a standard implementation. The process begins with a bit stream that can go from serial to parallel arrangements of groups (e.g., an "SIP" block). Then, the bit groups can be mapped with a Quadrature Amplitude Modulation (QAM) method, that converts the bits into complex-valued symbols. It is here where the conventional inverse FFT can be applied and where the traditional FFT can be replaced with an alternative called Fast Accurate Fourier Transform (FAFT) that allows for variable time-frequency windows. Upon applying the inverse FAFT, the signal can be converted to the time-domain which can be transmitted through an antenna. A part of the inverse FAFT output can be copied from the end to the beginning of the symbol, accounting for a Cyclic Prefix (CP). The time domain signal can go through a channel where the electromagnetic wave travels. At the receiver side, the CP can be removed. In the conventional OFDM, the remaining signal can be transformed employing the FFT. This stage can be replaced with the FAFT that can take a variable window on the signal and can reproduce the original complex-valued data with better resolution, making the transmission more robust to noise effects. The receiver can estimate when the packets begin and end, in order to recover the original constellation of symbols. With the recovered symbols, it is possible to de-map them into parallel bit groups and send them in a serial stream.

Figure 2:
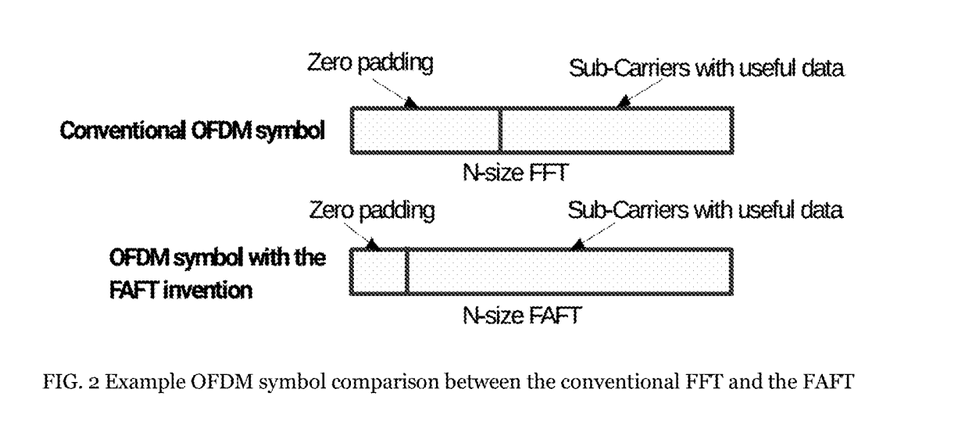
FIG. 2 illustrates a comparison between a conventional OFDM symbol that may use FFT and the symbol that may use the FAFT, according to aspects of the disclosure.

FIG. 2 shows an example comparison of a conventional OFDM symbol using FFT against the proposed symbol based on FAFT. At an ever higher demand for faster telecommunication transmissions, the useful data transmitted by the sub-carriers (SC) according to the standard methods, may not grow in proportion to the FFT size. This issue can be approached with the FAFT, as it can handle signals with higher resolution while minimizing the Inter-Symbol Interference (ISI).

Figure 3:
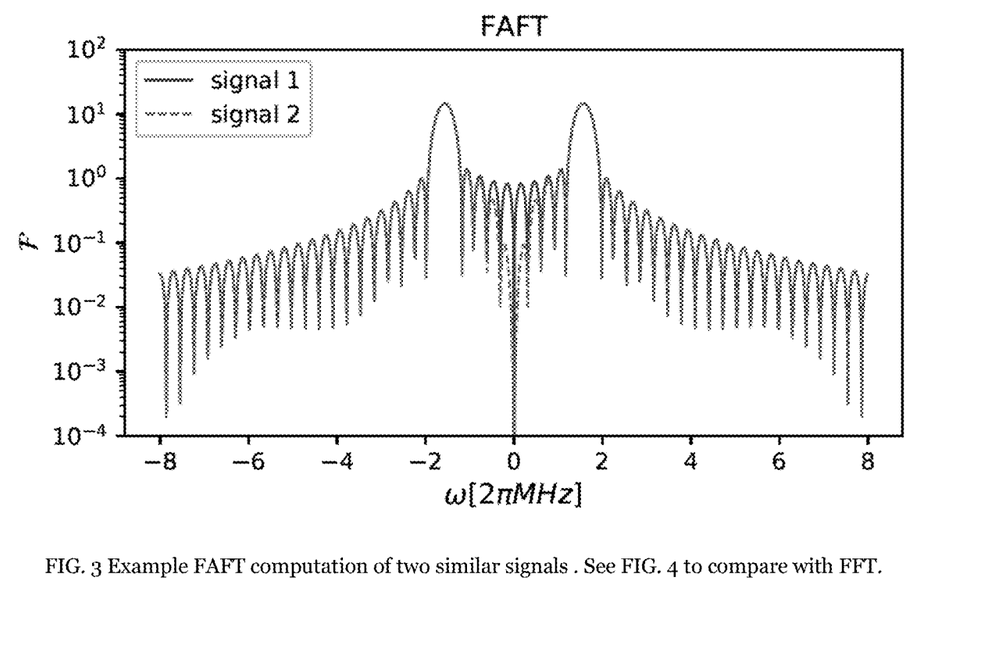
FIG. 3 illustrates an example embodiment of a frequency spectrum of two similar signals calculated using FAFT, which can provide a much higher resolution compared to FFT as shown in FIG. 4, according to aspects of the disclosure.
Figure 4:
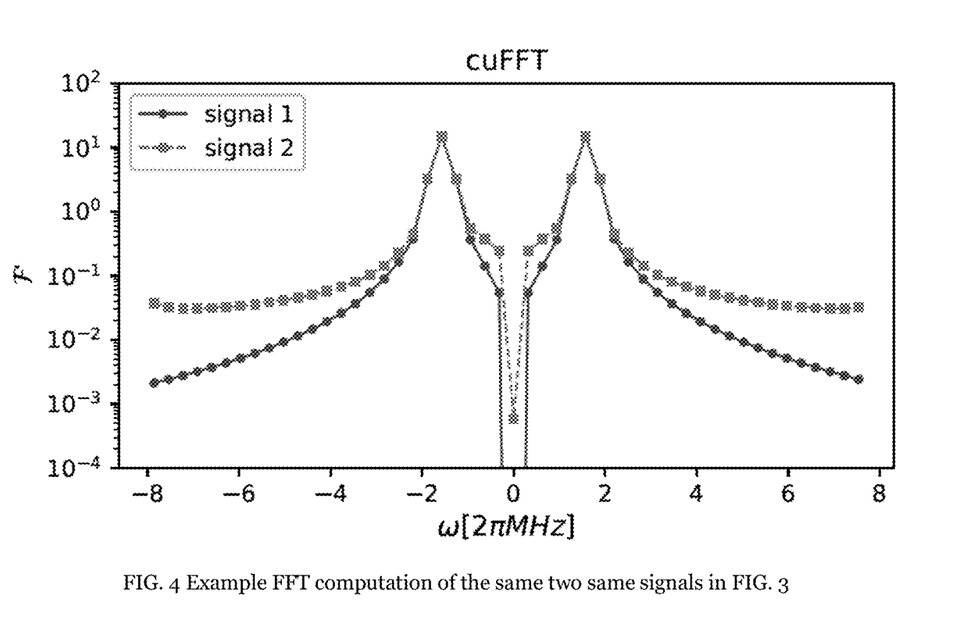
FIG. 4 illustrates the frequency spectrum, of the same signals in FIG. 3, calculated using FFT, according to aspects of the disclosure.

FIG. 3 illustrates an example of the frequency spectrum of two similar signals calculated using FAFT, which can provide a much higher resolution compared to FFT shown in FIG. 4. In this example, the time-domain signal can have a window of ±10 µs and the frequency-domain signal can be set to ±8×2πMHz. The number of points of the original signal can be 1024.

FIG. 4 illustrates an example of the frequency spectrum calculated using FFT. The same computation using FAFT is seen in FIG. 3. Contrary to FFT, the frequency window can be fixed for a given time window. In the present case, the frequency window can be fixed to ±161×2πMHz, which may be much larger than the FAFT frequency window in FIG. 3.

Consequently, the resolution of this plot may be significantly lower and may not be able to be improved without extensive zero padding in the original time domain signal.

Basic OFDM Pseudo-Code

The pseudo-code example in FIG. 7A-7E illustrates a basic OFDM transmission system described in FIG. 1 that can use the standard FFT pointing out the code lines that the embodiments of the invention are replacing by introducing the proposed FAFT and Inverse FAFT methods.

What is claimed:

1. A method for modulating and demodulating data in systems, comprising:
   converting bits in a bit stream of bit groups into complex-valued symbols;
   applying an Inverse Fast Fourier Transform (FFT) to the complex-valued symbols that represent the bit groups;
   replacing an FFT time window with a time window and a frequency window;
   transmitting a signal comprising the time window and the frequency window;
   converting the signal into complex-valued symbols; and
   converting the complex-valued symbols into bits,
   wherein a variation of frequencies of two signals in time is resolved.

2. The method of claim 1, wherein signals in the system are transformed with the time window and the frequency window.

3. The method of claim 2, wherein the variable size windows in the signal is used to reproduce original complex-valued data with better resolution, making the transmission more robust to noise effects.

4. The method of claim 2, wherein a channel is estimated in order to equalize the signal and obtain complex-valued symbols such that the recovered complex-valued symbols are demapped into parallel bit groups and a serial stream of bits is produced.

5. The method of claim 1, wherein the signal passes through a channel where an electromagnetic wave travels.

6. The method of claim 1, wherein a conventional zero padding size needed to increase the sampling rate is decreased.

7. The method of claim 1, wherein the tunable frequency windows that reduce the need for zero padding are used.

8. The method of claim 1, wherein a higher computational efficiency in the modulation and the demodulation that reduces hardware requirements is achieved.

9. The method of claim 1, wherein a data transmission is enabled on a low frequency system because the variable size signal windows increase frequency resolution not available when using FFT unless extensive zero padding is employed.

10. The method of claim 1, wherein a high frequency resolution is provided.

11. The method of claim 1, wherein the need for zero padding is reduced such that efficiency is increased for higher data transmission rates.

12. The method of claim 1, wherein zero padding is reduced to a few carriers in the frequency domain.

13. The method of claim 1, wherein an output is processed by copying a small section of a tail of modulated data to the beginning of the modulated data utilizing a Cyclic Prefix (CP) scheme.

14. The method of claim 13, further comprising:
copying a part of an inverse output from an end to a beginning, accounting for a Cyclic Prefix (CP).

15. The method of claim 13, wherein the CP comprises a guard interval that protects the signal from inter-symbol interference.

16. The method of claim 1, wherein the system is an OFDM system.

17. A system for modulating and demodulating data in systems, comprising:
a processor configured for:
converting bits in a bit stream of bit groups into complex-valued symbols;
applying an Inverse Fast Fourier Transform (FFT) to the complex-valued symbols that represent the bit groups;
replacing an FFT time window with a time window and a frequency window;
transmitting a signal comprising the time window and the frequency window;
converting the signal into complex-valued symbols; and
converting the complex-valued symbols into bits;
wherein a variation of frequencies of two signals in time is resolved.

\* \* \* \* \*